Sept. 20, 1955  F. B. NEWELL  2,718,241
DIFFERENTIAL PRESSURE RESPONSIVE UNITS
Filed April 18, 1952  2 Sheets-Sheet 2

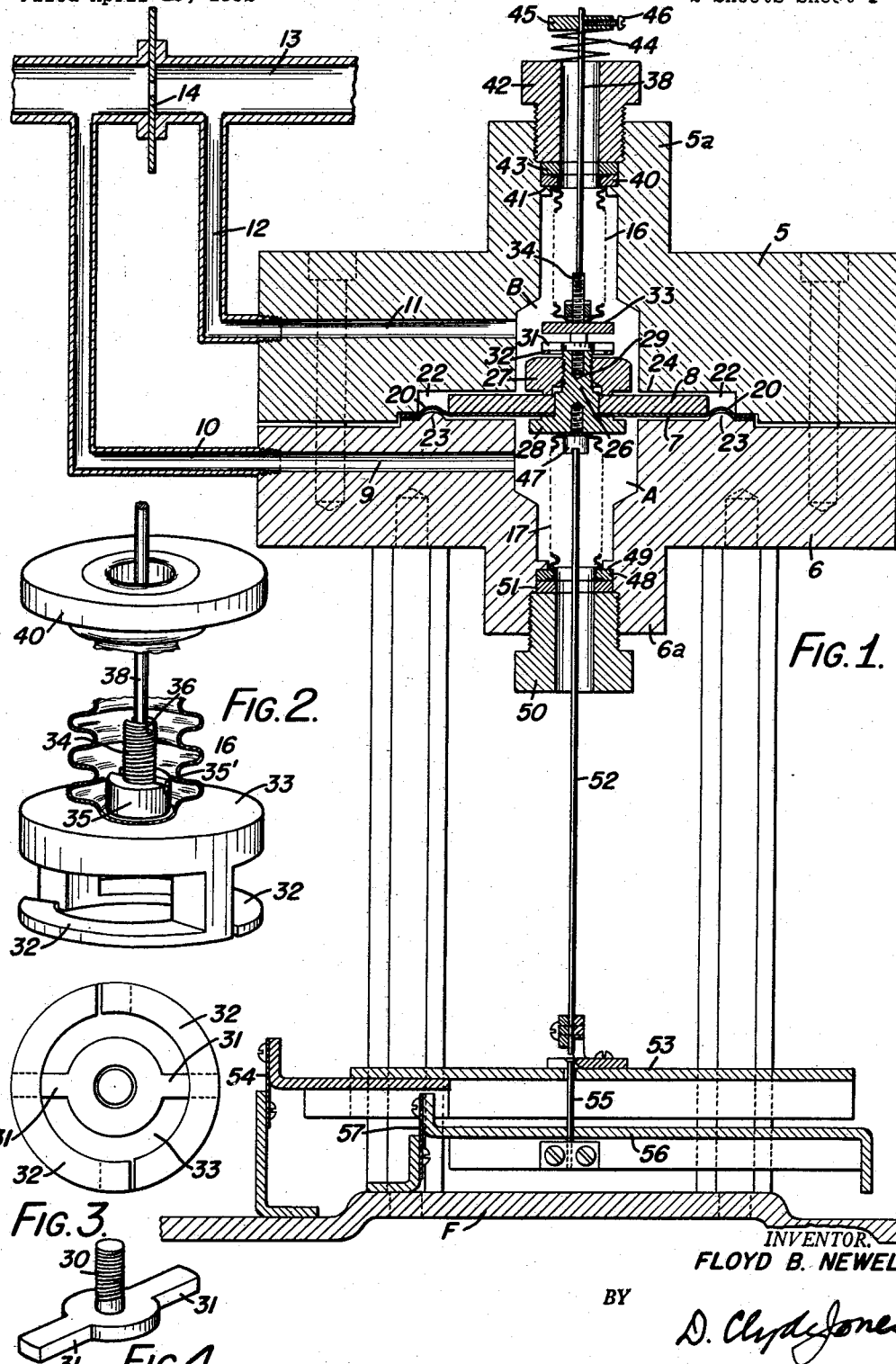

INVENTOR.
FLOYD B. NEWELL
BY
D. Clyde Jones
ATTORNEY

United States Patent Office 2,718,241
Patented Sept. 20, 1955

2,718,241

DIFFERENTIAL PRESSURE RESPONSIVE UNITS

Floyd B. Newell, Rochester, N. Y., assignor to Taylor Instrument Companies, Rochester, N. Y., a corporation of New York Application April 18, 1952, Serial No. 283,157

10 Claims. (Cl. 137—785)

This invention relates to a differential pressure transmitter or flow transmitter which is especially adapted for use in an indicating, recording or control system.

A differential pressure transmitter is provided with relatively thick walls and a diaphragm or the like, cooperating therewith to define pressure chambers. It, therefore, becomes necessary to transmit forces and motion from the diaphragm through the thick walls of the transmitter with a minimum loss of energy and without the introduction of pressure level errors.

The purpose of the present invention is the provision of a differential pressure transmitter which achieves the mentioned results by including therein a pressure level compensator.

A main feature of the invention relates to means for balancing the forces of two pressure elements having slightly different effective areas, consisting of an adjustable spring member interposed between the element having the larger effective area and the point at which the forces are to be equal.

Another feature of the invention relates to means for transmitting forces and motions from within a housing under internal high pressure, unaffected by pressure changes within the vessel, consisting of two opposed pressure elements having nearly equal effective areas and a spring coupling member connected between the element having the larger effective area and the point at which the forces and motion are to be obtained.

The various other features and advantages of the invention will appear from the detailed description and claims when taken with the drawings in which:

Fig. 1 is a vertical sectional view of the differential pressure transmitter of the present invention;

Fig. 2 is a fragmentary perspective view of a portion of the transmitter illustrating a part of the pressure level compensator; and Fig. 3 is a bottom view and Fig. 4 is a perspective view of the two cooperating parts of the pressure level compensator.

Figure 5:
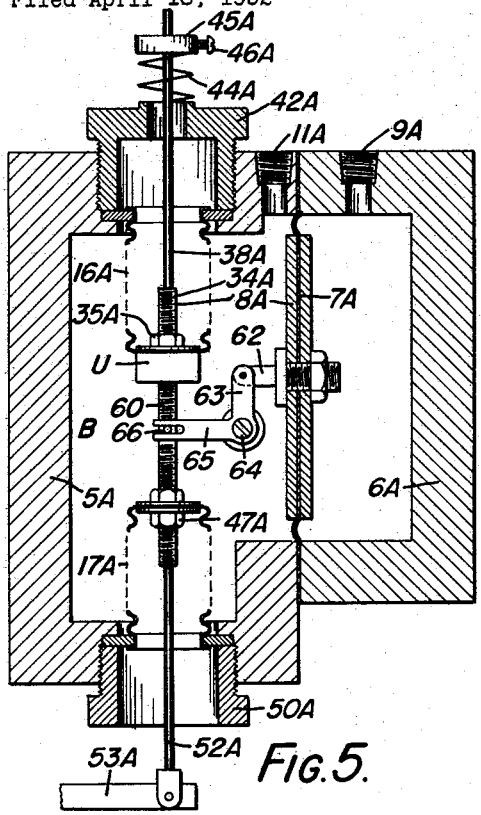
Fig. 5 is a modified design in which all of the mechanism is on one side of the diaphragm.

The differential pressure transmitter of the present invention comprises two relatively thick housing blocks 5 and 6 having opposed cavities therein communicating with the outside of the housing through the openings in the axially alined extensions 5a and 6a. A resilient diaphragm 7 provided with a center pad 8 and having its margin clamped between the two blocks, divides the housing into two chambers A and B. The chamber A communicates through passageway 9 and conduit 10 with a source of fluid under a relative high pressure while the chamber B communicates through passageway 11 and conduit 12 with the source of fluid under somewhat lower pressure. By way of example, the conduits 10 and 12 respectively communicate with a pipe 13 at opposite sides of an orifice plate 14 therein. By this arrangement, the pressure drop in the fluid flowing through the pipe 13 and its orifice plate 14 can be detected by the resultant fluid pressures or forces on the diaphragm 7. The resulting movements and forces developed by the diaphragm must be transmitted with minimum loss through the relatively thick wall of the housing, to mechanism to be actuated, such as an indicating instrument.

In accordance with one form of the present invention, there is provided novel means for transmitting forces and motions through the heavy wall of the housing, which means consists of two substantially equalized bellows 16 and 17 mounted in axial alignment, with their inner ends sealed to the center pad of the diaphragm and with their outer ends respectively sealed to the walls of the housing. The forces exerted by these two bellows on the diaphragm pad 8 must be very nearly equal at all pressure levels or else the instrument reading will change as the pressure level is changed. For this reason, the effective areas of the two bellows must be small and must be as nearly equal to each other as possible. Since it is difficult commercially to make bellows having exactly the same effective areas, compensating means must be provided for equalizing the bellows forces. One former method of compensating for the difference in the effective areas of a pair of bellows, makes use of the fact that the effective area of a bellows increases as it is compressed and decreases as it is expanded. By way of example let it be assumed that there are two bellows (or diaphragms) of approximately equal areas acting in opposite directions and subjected to the same pressures, in which case the effective areas should ideally be equal so that the forces are equal and opposite.

It is proposed in accordance with the present invention to bring about a compensation for small differences in bellows areas by allowing one of the bellows to change in length slightly and thereby add to or subtract from its force (due to pressure times area), a second force due to motion times spring rate which will make the net force equal to that of the other bellows. By varying the stiffness of a spring, the said motion of the bellows can be adjusted to the proper amount for exact compensation. This compensating feature will be understood from the following detailed description of the construction of the diaphragm, with its related pair of bellows. The differential diaphragm can be of any of the well known types. However, it is preferred to use a single diaphragm 7 of metal, plastic or the like having an annular corrugation 20 molded therein and having a large center portion reinforced by a rigid circular metal pad 8 which leaves an exposed annular area 22 between the edge of the pad and the adjacent walls of the housing blocks between which the margin of the diaphragm is clamped. The exposed annular area of the diaphragm with the molded corrugation 20 therein, mates with an annular ridge 23 on the lower block of the housing. Thus the concave surface of the diaphragm corrugation cooperates with the convex ridge on the block to afford pressure protection for the high pressure side of the diaphragm. It will be noted that a similar arrangement is not necessary for the lower pressure side of the diaphragm, that is, the upper surface of the diaphragm, since the pad 8 of the diaphragm engages the adjacent surface 24 of the upper block 5 which serves as a stop, and the diaphragm can support the pressure on its concave side. The pad 8 and the diaphragm 7 are centrally clamped together in sealed relation by a bolt 26 and a cooperating nut 27. The bolt has a relatively large flat head 28 engaging the lower surface of the diaphragm and also has a threaded stem 29 which passes through registering central openings in the diaphragm and in the pad. The nut 27 is in threaded engagement with the stem 29. The upper end of stem 29 has screwed therein, the threaded bolt 30 (shown inverted in Fig. 4) integral with and projecting from the member provided with arms 31, 31 which extend at right angles to the principal axis of the bellows 16. These arms engage the curved spring fingers 32, 32 of the coupling element 33 (Figs. 2 and 3). The top of this element has an upwardly projecting threaded lug 34 extending centrally therefrom into the lower end of the bellows 16. A nut 35 threaded on this lug seals the lower end of the bellows 16 to the top of element 33. The lug 34 is provided with a kerf 36 therein to receive an adjusting tool (not shown). The lug 34 has one end of a wire 38 soldered thereto to extend through the upper end of the bellows 16. The upper end of this bellows is sealed to an annular washer 40 which is adapted to rest on the shoulder 41 of the extension 5a. A tubular plug 42 which is screwed into the extension 5a, forces a metal gasket 43 against washer 40, to prevent leakage from chamber B at the shoulder 41. The upper portion of the wire 38 extends through the plug 42 and through a biasing coiled spring 44 which rests on the upper end of the plug. The upper end of the wire 38 has a washer 45 secured thereto by a set screw 46. The washer 45 rests on the spring 44 and the setscrew enables the biasing action of the spring to be adjusted.

The upper end of the bellows 17 is fastened in sealed relation to the head 28 by a screw 47. The lower end of the bellows 17 is sealed to a washer 48 which rests on the shoulder 49 of the housing. A tubular plug 50 screwed into the extension 6a, forces a metal gasket 51 against the washer 48 so that there is no leakage from chamber A at the shoulder 49. A wire 52 soldered to the head of the set screw 47, extends through the bellows 17 and the plug 50, to mechanism to be actuated. This mechanism which may assume various forms, is herein illustrated as comprising a lever 53 hinged at 54 on a part of the frame F, the lower end of the wire 52 being secured to a part carried at an intermediate point on lever 53. The lever 53 is for transmitting forces to the rest of the mechanism and lever 56 for transmitting motions. The wire 52 in operating lever 53, acts through rod 55 to transmit a corresponding motion to the lever 56 which is hinged at 57 on the frame. The hinged levers 53 and 56 may be parts of an instrument more fully disclosed in the Patent 2,536,198 to Newell et al., granted January 2, 1951.

In the operation of the transmitter, it is essential that the bellows 16 and 17 have substantially equal effective areas, as pointed out above. Since it is difficult to obtain commercial pairs of bellows having matched areas when assembled in a transmitter, the compensator of the present invention is provided. When bellows 16 and bellows 17 are to be adjusted to have equal effective areas, the set screw 46 is loosened so that the washer 45 and the coiled spring 44 are removed. A hollow tool (not shown) has parts to engage the kerf 35' in the top of nut 35 so that this nut can be loosened. A second hollow tool (not shown) which can be telescoped within the first tool, has parts which engage the kerf 36 in the top of the lug 34. After the nut 35 has been loosened sufficiently, the lug 34 with its integral coupling element 33 can be rotated so that different parts of its spring fingers 32 are engaged by the arms 31 constituting the other part of the coupling unit. As the element 33 is rotated counterclockwise, the arms 31 engage successive parts of the spring fingers 32, from the fixed ends thereof toward the free ends thereof. This adjustment progressively reduces the effective spring constants of the fingers 32. As the spring constants of the springs 32 are decreased, the effective force of the bellows 16 is reduced until it matches the effective force of bellows 17. Preferably the bellows 16 and 17 are so selected that bellows 16 has the greater effective area. When the parts have been adjusted as desired, the nut 35 is tightened and the coiled spring 44 with the washer 45 are locked on the upper end of the wire 38 by the set screw 46. Thus the forces transmitted by the wire 52 to the external mechanism are directly proportional to the differences between the pressures in the pipes 10 and 12 acting on the diaphragm 20 and are unaffected by the absolute values of these pressures, that is, by what has been called the "pressure level."

In the modified form of the invention illustrated in Fig. 5, the pressure level compensating means as well as the take-off means are all included in one chamber such as B at one side of the diaphragm 7A instead of having each of these means in a separate chamber such as in chambers A and B in the construction of Fig. 1. In this modification, the elements having the same construction and function as the corresponding elements of Fig. 1, are identified by the same reference characters with the suffix "A" added thereto. In this form of the invention the bellows 16A and 17A are adjustably connected together by the rods 60 and 61 which rods are adjustably coupled together by the coupling unit U. This unit comprises the parts 30 and 31 and the parts 32 and 33 as shown in Figs. 2, 3 and Fig. 4. In this modification, the motion of diaphragm 7A, is applied by a stud 62 secured to the diaphragm and pivoted to the arm 63 of a bell crank lever. This lever which is mounted on a fixed pivot 64, has its other arm slotted at its free end to receive a transverse pin 66 mounted on rod 60.

In the operation of the modified form of the invention shown in Fig. 5, the resultant of the differences in pressures applied to the opposite sides of diaphragm 7A, correspondingly move the stud 62 to the right or to the left. This stud acting through the bell crank lever moves the rod 60 and wire 52A to transmit the motion of the diaphragm 7A located within the thick-walled housing, out to the external, hinged lever 53A.

Figure 6:
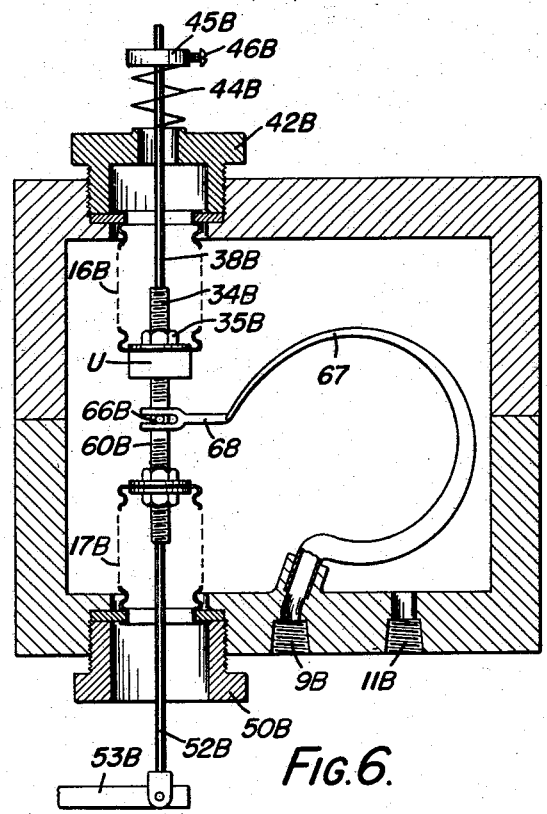
Fig. 6 is a modification in which a Bourdon spring replaces the diaphragm of Figs. 1 and 5.

The modified form of the invention shown in Fig. 6 differs from the form illustrated in Fig. 5 by the fact that a Bourdon spring 67 replaces the diaphragm 7A. The parts of this modification having parts of like construction and function with those shown in Fig. 5, are identified by the same numerals with the suffix "B" substituted for the suffix "A." The low pressure at one side of the orifice plate is communicated through passage 11B in the wall of the housing to the chamber B therein, while the higher pressure at the other side of the orifice plate is communicated through the passage 9B to the interior of the Bourdon spring 67 which tends to uncoil or to coil up in the well-known manner in response to differences in fluid pressures applied to its inner and outer wall surfaces. The movable end of the Bourdon spring has a slotted take-off arm 68 to engage a pin 66B mounted on the rod 61B. The compensating means and take-off means of this modification may be substantially identical in form with that shown in Fig. 5.

The operation of this form of the invention is similar to that illustrated in Fig. 5 and therefore need not be restated.

Figure 7:
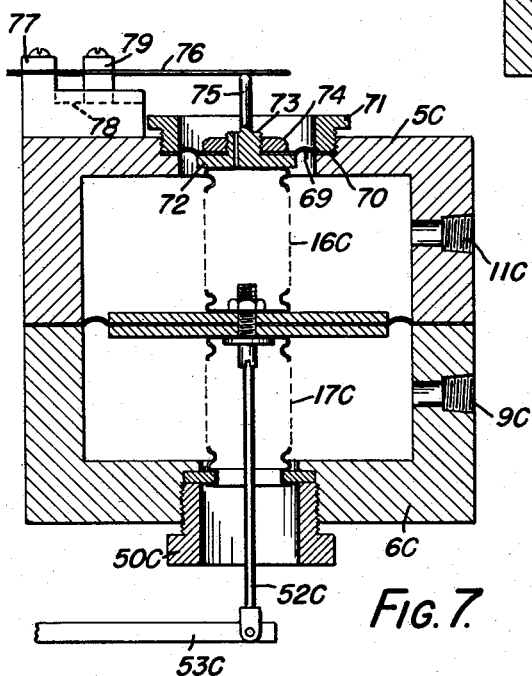
Fig. 7 is a modification in which the end of the bellows away from the diaphragm is forced to move to effect compensation.

The further modified form of the invention shown in Fig. 7 differs from that shown in Fig. 1 by having the level compensating means located externally of the housing comprising the parts 5C and 6C. In this modification, the parts having like structure and function with those of Fig. 1 are identified by the same reference characters with the suffix "C" added thereto. In this device the upper end of the bellows 16C is supported on a resilient diaphragm 69, the margin of which is clamped between the shoulder 70 and the annular nut 71, that is screwed into block 5C. Specifically the upper end of bellows 16C is soldered to a metal disc 72 with a threaded lug 73 projecting axially from the upper surface thereof to extend through a central opening in the diaphragm. This lug is engaged by a nut 74 to clamp the inner margin of the diaphragm therebetween in sealed relation. It will be noted that the interior of the bellows 16C communicates with the atmosphere through an opening in disc 72.

The lug 73 carries an axially extending pin 75 to be engaged by the free end of a horizontal cantilever spring 76. The left end of this spring is clamped by a rigid bracket 77.

It will thus be seen that the present invention provides an arrangement to balance the forces of two opposed pressure elements (bellows, diaphragms, Bourdon springs or the like) where their effective areas differ by a small amount, as the pressures in both are increased but maintained equal, by reducing the force of the one having the larger effective area by allowing the element to move against a restraining spring unit (which can be fixed or variable) placed between it and the balance point by forcing the end attached to diaphragm 69 to move outward by means of an auxiliary pressure element which is acted upon by the same pressure. The bracket 77 is provided with a way 78 extending parallel to the spring 76. This way receives a clamping block 79 which clamps the spring 76 whereby the effective length and therefore the spring rate of this spring can be adjusted as desired.

What I claim is:

1. In a force responsive unit, two cooperating pressure responsive elements of similar but unequal effective areas mounted in opposing relation and arranged to be subjected to pressures over a relatively large pressure range, each of said pressure responsive elements having a fixed portion and a movable portion, a member tending to be undesirably affected by unequal forces developed by said elements due to their unequal effective areas, means engaging and supporting the fixed portions of said pressure responsive elements positioned in axial alinement therewith, means engaging and coupling the movable portion of said pressure responsive elements positioned in axial alinement therewith and means incorporated in one of said engaging means for equalizing the forces developed by said elements comprising mechanism for absorbing some of the energy developed by that one of the elements which produces the greater force.

2. In a force responsive unit, a pair of opposing pressure responsive bellows in axial alignment having similar but unequal effective areas subject to pressures in a given pressure range, supporting means for the pair of bellows, means coupling the pair of bellows to said supporting means, a member tending to be undesirably actuated by the unequal forces developed by said pair of bellows due to the unequal effective areas thereof, means coupling the pair of bellows to said member, and mechanism tending to equalize the forces of the pair of bellows comprising resilient means having an adjustable spring rate incorporated in one of said coupling means.

3. A force responsive unit, a pair of opposing pressure responsive bellows of similar but unequal effective areas subjected to pressures in a given pressure range, means coupling in axial alinement the adjacent ends of the pair of bellows, supporting means for the pair of bellows, means coupling the remote ends of the pair of bellows to the supporting means, a member tending to be undesirably actuated by the unequal forces developed by said pair of bellows due to the unequal effective areas thereof, and mechanism tending to equalize the effective areas of the pair of bellows comprising resilient means having an adjustable spring rate incorporated in one of said coupling means.

4. A force responsive unit, a pair of opposing pressure responsive bellows of similar but unequal effective areas subjected to pressures in a given pressure range, means coupling in axial alinement the adjacent ends of the pair of bellows, supporting means for the pair of bellows, means coupling the remote ends of the pair of bellows to the supporting means, a member tending to be undesirably actuated by the unequal forces developed by said pair of bellows due to the unequal effective areas thereof, and a unit incorporated in one of said coupling means tending to equalize the effective areas of the pair of bellows, said unit comprising an element provided with arcuate spring fingers each being rigidly mounted at one end only thereof extending in a direction perpendicular to the principal axes of said bellows and a rigid arm having its ends respectively engageable with different portions of said spring fingers whereby the spring rate of said unit can be adjusted.

5. In a force responsive unit, a pair of opposing bellows of similar but unequal effective areas mounted in axial alinement and arranged to be subjected to pressures over a relatively large pressure range, a member jointly actuated by said pair of bellows and tending to be undesirably affected by unequal forces developed by said elements due to their unequal effective areas, and means interposed between and in axial alinement with said pair of bellows for equalizing the forces developed thereby comprising mechanism including a spring unit having an adjustable spring rate for absorbing some of the energy developed by that one of the pair of bellows which produces the greater force.

6. In a differential pressure transmitter, two similar thick-walled housing blocks clamped together at their margins to define a housing, each block having a cavity therein communicating with a central opening through the wall of its related block, a flexible diaphragm clamped in sealed relation between the margins of said blocks, said diaphragm dividing the interior of said housing into two pressure chambers, a conduit individual to each chamber for communicating fluid under pressure thereto, mechanism transmitting the resultant force of the diaphragm through the thick walls of the housing, said mechanism comprising a pair of bellows of similar areas, one bellows being contained in one chamber and the other bellows being contained in the other chamber, means sealing and coupling one end of each bellows to the wall of its related block around the central opening therein, means sealing and coupling the other end of each bellows to the related surface of said diaphragm whereby each chamber is sealed closed, one of said coupling means comprising an arcuate spring supported at one end only thereof in a plane parallel to said diaphragm and an arm adapted to engage different parts of said arcuate spring, and a transmitting member connected to the diaphragm at one surface thereof and extending through one of said bellows to the exterior of the housing.

7. In a differential pressure transmitter, two similar thick-walled housing blocks clamped together at their margins to define a housing, each block having a cavity therein communicating with a central opening through the wall of its related block, a flexible diaphragm clamped in sealed relation between the margins of said blocks, said diaphragm dividing the interior of said housing into two pressure chambers, a conduit individual to each chamber for communicating fluid under pressure thereto, mechanism transmitting the motion of the diaphragm through the thick walls of the housing, said mechanism comprising a pair of bellows of similar areas, one bellows being contained in one chamber and the other bellows being contained in the other chamber, means sealing and coupling one end of each bellows to the wall of its related block around the central opening therein, means sealing and coupling the other end of each bellows to the related surface of said diaphragm whereby each chamber is sealed closed, one of said coupling means being adjustable from the exterior of the housing and being characterized by having an adjustably spring characteristic whereby the effective area of one of said pair of bellows can be made substantially equal to that of the other, and a transmitting member connected to the diaphragm at one surface thereof and extending through one of said bellows to the exterior of the housing.

8. In a force responsive unit, a pair of opposing pressure responsive elements of similar but unequal effective areas subjected to pressures in a given pressure range, support means for said pair of elements, each of said pressure responsive elements having a fixed portion and a movable portion, means coupling the fixed portions of said pressure responsive elements to said support means, means coupling the movable portions of said pressure responsive elements together and means incorporated in one of said coupling means for equalizing the forces developed by said elements comprising mechanism for absorbing some of the energy developed by that one of the elements which produces the greater force.

9. In a force responsive unit, a pair of opposing pressure responsive elements having similar but unequal effective areas subject to pressures in a given range, supporting means for the pair of elements, a member tending to be undesirably actuated by the unequal forces developed by said pair of elements due to the unequal effective areas thereof, means coupling the pair of elements to said supporting means, means coupling the pair of elements to said member, and mechanism tending to equalize the forces of the pair of elements comprising resilient means connected in series with one of said elements between said member and said supporting means whereby some of the energy developed by one of said pair of elements is absorbed by said resilient means.

10. In a force responsive unit, a pair of opposing pressure responsive bellows having similar but unequal effective areas subject to pressures in a given pressure range, supporting means for the pair of bellows, a member tending to be undesirably actuated by the unequal forces developed by said pair of bellows due to the unequal effective areas thereof, one end of one of said bellows being connected to said supporting means and the opposite end thereof being connected to said member, connecting means connecting one end of the other of said bellows to said supporting means and connecting means connecting the opposite end thereof to said member, one of said connecting means for said other bellows comprising resilient means whereby some of the energy developed by said other bellows is absorbed by said resilient means.

References Cited in the file of this patent

UNITED STATES PATENTS

| | | |
|---|---|---|
| 2,079,069 | Johnson | May 4, 1937 |
| 2,475,894 | Hermanny | July 12, 1949 |
| 2,491,998 | Mikina | Dec. 20, 1949 |
| 2,632,474 | Jones | Mar. 24, 1953 |

FOREIGN PATENTS

| | | |
|---|---|---|
| 287,930 | Great Britain | Aug. 30, 1928 |